Jan. 16, 1968  G. E. PETERSON ETAL  3,364,425
FUNDAMENTAL FREQUENCY DETECTOR UTILIZING
PLURAL FILTERS AND GATES

Filed Aug. 23, 1963  2 Sheets-Sheet 1

INVENTORS
Gordon E. Peterson
Giles G. Peterson
By Richard J. Miller
Atty.

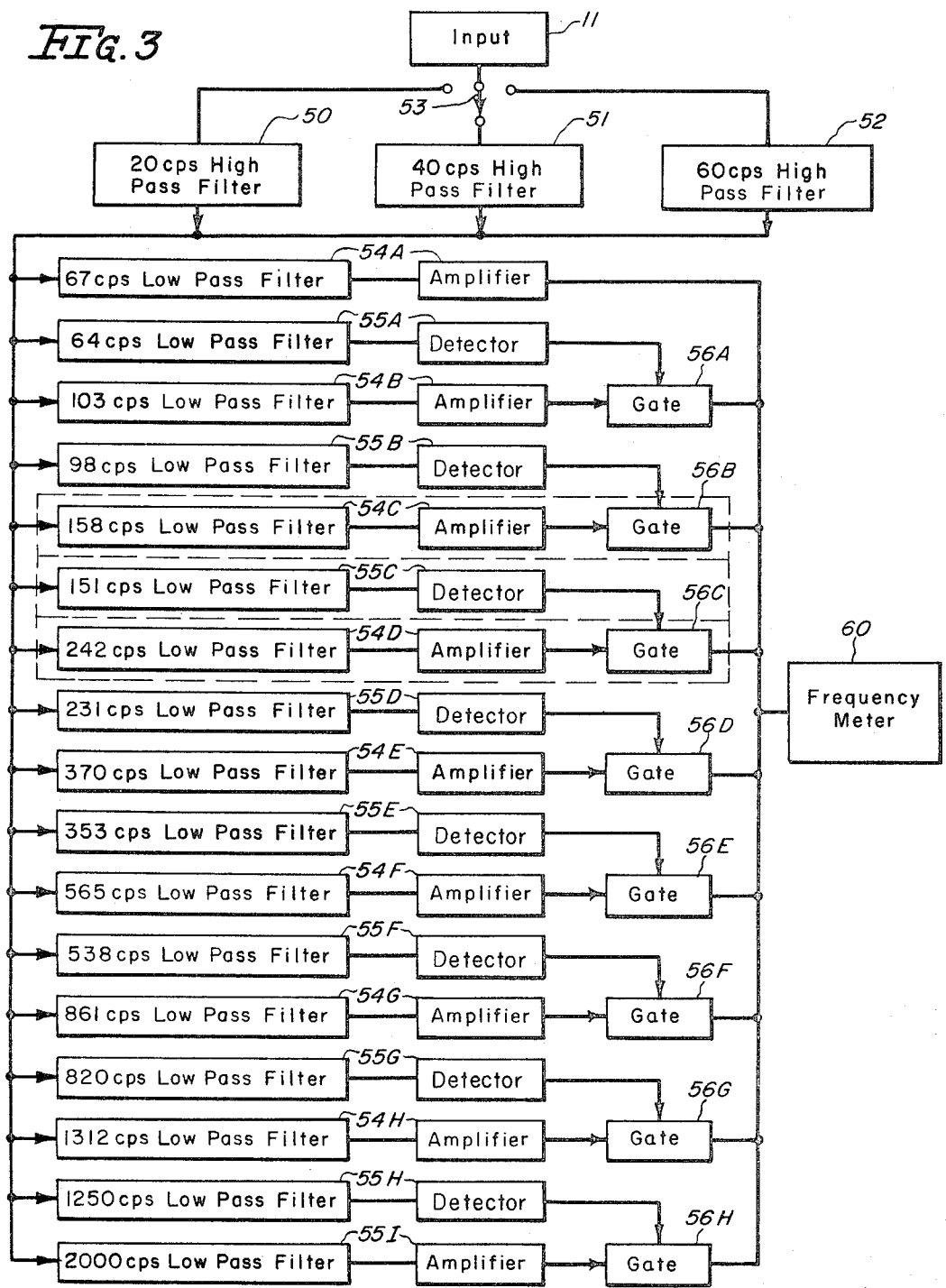

3,364,425
FUNDAMENTAL FREQUENCY DETECTOR UTILIZING PLURAL FILTERS AND GATES
Gordon E. Peterson and Giles G. Peterson, Ann Arbor, Mich., assignors, by mesne assignments, to the United States of America as represented by the Secretary of the Navy
Filed Aug. 23, 1963, Ser. No. 304,292
5 Claims. (Cl. 324—77)

ABSTRACT OF THE DISCLOSURE

This invention deals primarily with means of automatically analyzing the fundamental signal present in a signal containing fundamental and harmonic frequencies and is practically adapted to use human speech analyzers. A plurality of gating means are provided in a plurality of filter circuits, which have consecutively increasing pass bands, to prevent the passage of any signal higher than the fundamental.

---

This invention relates to a signal analyzer and more specifically to a fundamental frequency analyzer for determining the fundamental frequency appearing in a complex electrical signal.

Previous methods of fundamental voice frequency analysis are basically two in nature. In one method, a low pass filter with only a few decibel per-octave attenuation is employed to emphasize the fundamental frequency, and a frequency detector is then used to indicate the frequency of the wave at the output of the filter. In the second method, successive major peaks in the amplitude wave are detected as a function of time. Spacing between these peaks may provide a measure of the period of the fundamental of the speech wave.

The major disadvantage of the first method described is that the fundamental frequency may be very weak in amplitude in some places in the speech wave. When this occurs, the second harmonic may be higher in amplitude than the fundamental at the output of the low pass filter and is thus measured by the frequency detector. A second disadvantage is that a single filter is not applicable to a wide range of fundamental frequencies, so that either the range of the circuit is very restricted or manual switching must be employed according to the range of the speaker's voice under analysis. The major disadvantage of the second method described above is that more than one major peak may occur within one voice period in the speech wave. If two or more peaks which are approximately equal in amplitude occur within one period, then a false reading of the fundamental voice frequency is very likely to result.

Therefore, it is the object of this invention to provide an improved signal analyzer.

It is a further object of this invention to provide an improved signal analyzer for obtaining the fundamental frequency of speech signals.

It is a further object of this invention to provide a signal analyzer which is capable of obtaining the fundamental frequency regardless of the strength of the overtones present in the signal.

It is yet a further object of this invention to provide a signal analyzer comprising, an input means for receiving a signal to be analyzed, first means, for passing a first selected band of signals coupled to the input means, second means for passing a second selected band of signals including first band of signals coupled to the input, third means coupled to the input means passing a third selected band of signals and coupled to the second means for preventing the second means from passing signals when the first means passes signals, and output means coupled to the first and second means for indicating signals passed by the first and second means.

Further objects of the advantages of the invention will become apparent from the following specification, claims, and figures, wherein:

FIG. 3 is a block diagram of a speech analyzer.

Figure 1:
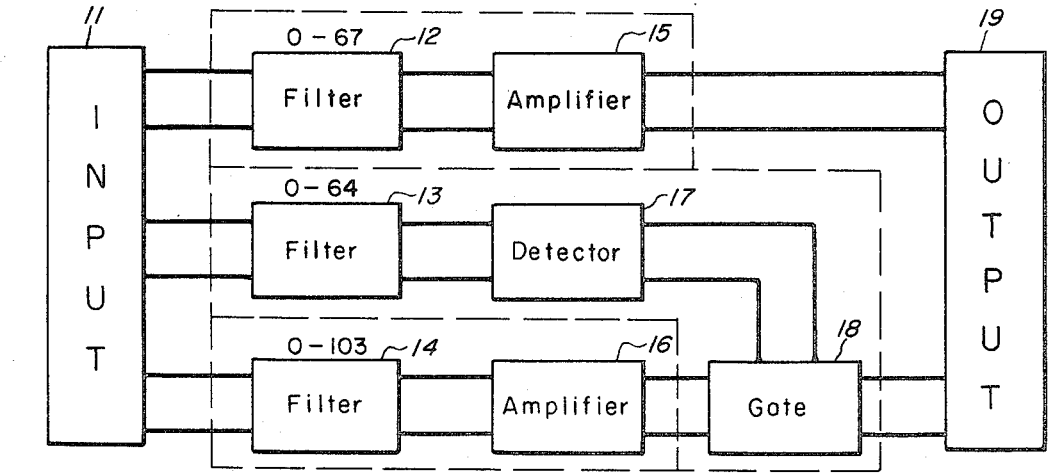
FIG. 1 is a block diagram of one embodiment of the invention.

FIG. 1, is a simplified block diagram of a signal analyzer which is practically adaptable for separating fundamental frequencies in a signal which contains harmonics thereof. An input 11 is shown which is capable of receiving a signal to be analyzed. Three low pass filters 12, 13, and 14 are shown connected to input 11 and all receive the signal to be analyzed. Amplifiers 15 and 16 are coupled to filters 12, 14 and serve to increase the amplitude of signals passed by the filters. A detector circuit 17 connected to filter 13 and a gate circuit 18 coupled to amplifier 16 and circuit 17 has its output coupled to an output circuit 19. Amplifier 15 is also coupled to the output 19 which is schematically shown as a block diagram but would normally be a frequency meter or oscilloscope which serve to indicate to receive the fundamental frequency.

Low pass filter 12 is selected to have characteristics whereby a given pass band is obtained which allows signals to be passed therethrough within a given frequency range. Filter 13 has a pass band which is less than the pass band of filter 12. Filter 14's pass band is approximately twice that of filter 13, although in one successful embodiment of the invention it is slightly smaller than twice the pass band of filter 13.

Assume, for the sake of illustration and not as a limitation upon the invention, that filter 12 has a pass band from 0–67 cycles per second, filter 13 has a pass band of 0–64 cycles per second and filter 14 has a pass band of 0–103 cycles per second. When a signal is received which has a fundamental frequency of 50 cycles per second and includes a harmonic of 100 cycles per second then filters 12 and 13 will pass the fundamental frequency and filter 14 will pass both the fundamental and the harmonic. Amplifier 15 produces a signal which is passed to output circuit 19. Detector 17 generates a signal in response to the fundamental signal passing filter 13 and serves to render gate 18 closed to signals generated by amplifier 16, and both the fundamental and harmonic signals passed by filter 14 are blocked from entering output circuit 19. Thus, although the signal received at input 11 is composed of two signals, that is a fundamental and a harmonic, only the fundamental appears in the output 19.

If the composite signal received is 70 cycles per second and includes a harmonic at 140 cycles per second then filters 12 and 13 do not pass any substantial amount of the signals. Filter 14 passes the 70 cycle signal thru to amplifier 16 and gate 18, normally open in absence of a control signal from detector 17 allows the 70 cycle signal to pass to output circuit 19.

Figure 2:
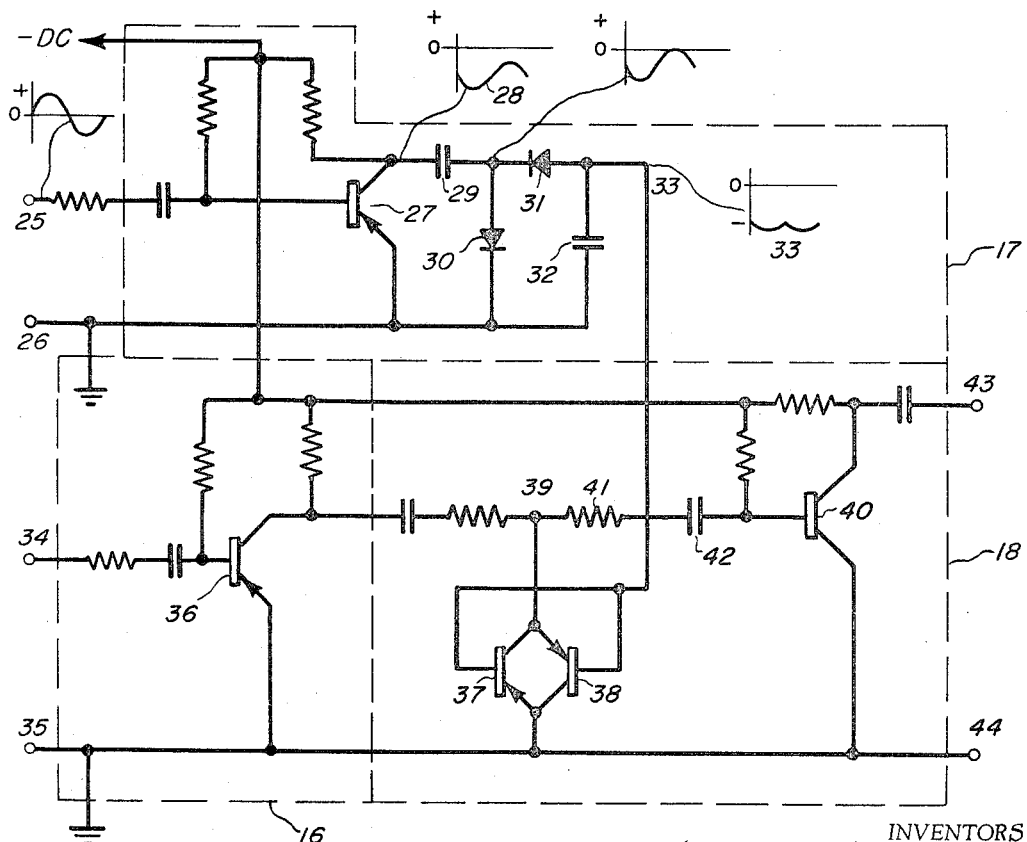
FIG. 2 is a circuit diagram incorporating the invention.

FIG. 2 shows a detailed circuit diagram for amplifier 16, detector 17 and gate 18 of FIG. 1. Assuming the first example of received signal as set forth above, filters 13 and 14 pass the signal as described, the 50 cycle signal as represented by sine wave is received across a pair of terminals 25, 26 and is amplified through transistor circuit 27 producing a signal 28 as set forth at the collector of transistor 27. This signal is coupled through a capacitor 29 and a pair of diodes 30, 31 and produce in conjunction with a capacitor 32 a signal as shown at point 33. The composite signal of 50 and 100 cycles per second is received from filter 14 at a pair of terminals 34, 35 and would be amplified by transistor 36. However, the signal 33 serves to bias a pair of transistors 37, 38 to provide a low impedance path to any alternating current signal appearing at point 39 and a transistor 40 coupled thereto through a resistor 41 and capacitor 42 will produce zero signal out across a pair of terminals 43 and 44. Thus, the output circuit 19 contains only the fundamental signal passed by the previous stage.

FIG. 3 shows an embodiment of the invention wherein three high pass filters 50, 51 and 52 are coupled thru a switching circuit 53 to the input 11. The purpose of these filters is to eliminate certain undesired frequencies which might appear in the signal but would normally not occur in voice signal analysis. A plurality of signal circuits, including low pass filters, are shown designed by 54A through 54I, the filter pass band characteristics are indicated in the blocks and it is to be noted that each successive signal circuit has a pass band slightly less than twice that of the previous signal circuit. That is 54A has a pass band of 67 cycles per second and the pass band of 54B is 103 cycles per second. There is further included a group of control circuits designated 55A through 55H, individually coupled between filters 50, 51, 52 and a series of gate circuits 56A through 56H. The pass band of the individual control circuit filters is slightly below that of the previous signal circuit filter to insure proper elimination of signals through the operation of the circuits. It is to be noted that with ideal filter characteristics, that is, sharp cut-off at a specific frequency it would be possible to have the signal circuit filters approximately an octave apart, however, to insure proper discrimination between signals it has been found desirable to utilize a factor of approximately ⅔ of an octave increase for each successive signal circuit.

In operation of the embodiment shown in FIG. 3 switch 53 is set to eliminate signals received below a given frequency. This is found desirable because speech signals do not normally include frequencies in the designated ranges of filters 50, 51, 52 and the noise level is thus reduced.

Assume a composite signal is received containing a fundamental at 80 cycles per second, and harmonics at integral multiples of 80 cycles per second, namely: 160, 240, 320, 400, 480, 560, 640, 720, 800, 880, 960, 1040, 1120, 1200, 1280, etc. Before the signal is received all gates 56A to 56H are conditioned to allow passage of signals. Circuits 54B through 54I pass the 80 cycle signal, 54D through 54I pass the 160 cycle signal, 54E through 54I pass the 320 cycle signal, 54G through 54I pass the 640 cycle signal and 54H, 54I pass the 1280 cycle signal. Gate 56A remains open allowing the 80 cycle signal to be received at a frequency meter 60. Circuit 55B generates a signal actuating gate 56B to prevent any signals passing through circuit 54B from reaching the meter 60. Similarly gates 56C through 56H are activated to prevent any of the harmonics from appearing at meter 60.

We claim:
1. An improved signal analyzer for determining the fundamental frequency in a received signal, comprising:
   (a) an input circuit coupled to receive and pass said received signal and having a plurality of outputs;
   (b) a first circuit having a pass band from a first predetermined minimum frequency to a first predetermined maximum frequency coupled to an output of said input circuit;
   (c) a second circuit having a pass band from said first predetermined minimum frequency to a second predetermined maximum frequency coupled to an output of said input circuit;
   (d) a third circuit having a pass band from said first predetermined minimum frequency to a third predetermined maximum frequency coupled to an output of said input circuit;
   (e) a fourth circuit coupled to said second and third circuits; and
   (f) an indicating output circuit coupled to receive signals from said first circuit and said fourth circuit, said third predetermined frequency being higher than said first and second predetermined maximum frequencies, said fourth circuit being capable of preventing signals from being transmitted by said third circuit when signals are received at said first and second circuits which are passable thereby to said output circuit and said fourth circuit transmitting signals passed by said third circuit when the fundamental frequency of the received signal is higher than said first and second maximum predetermined frequencies.

2. The analyzer of claim 1 wherein said first predetermined maximum frequency and said second predetermined maximum frequency are substantially equal.

3. The analyzer of claim 2 wherein said second predetermined maximum frequency is a value between one and two times that of said first predetermined maximum frequency.

4. The analyzer of claim 3 wherein said predetermined minimum frequency is equal to zero.

5. The analyzer of claim 1 wherein said input circuit has selective means for eliminating fundamental frequencies below a given value.

References Cited

UNITED STATES PATENTS

| 2,699,464 | 1/1955 | Di Toro et al. | 324—77 |
| 2,999,205 | 9/1961 | Sichak et al. | 324—77 |
| 3,215,934 | 11/1965 | Sallen | 324—77 |

RUDOLPH V. ROLINEC, *Primary Examiner.*

WALTER L. CARLSON, *Examiner.*

PAUL F. WILLE, *Assistant Examiner.*